United States Patent
Fernald et al.

(10) Patent No.: US 8,914,624 B2
(45) Date of Patent: Dec. 16, 2014

(54) CHANGING THE RESET STATE OF A PROCESSOR

(75) Inventors: Kenneth W. Fernald, Austin, TX (US); Paul I. Zavalney, Austin, TX (US)

(73) Assignee: Silicon Laboratories Inc., Austin, TX (US)

( * ) Notice: Subject to any disclaimer, the term of this patent is extended or adjusted under 35 U.S.C. 154(b) by 970 days.

(21) Appl. No.: 12/976,263

(22) Filed: Dec. 22, 2010

(65) Prior Publication Data

US 2012/0166778 A1 Jun. 28, 2012

(51) Int. Cl.
*G06F 1/24* (2006.01)
*G06F 13/00* (2006.01)
*G06F 9/44* (2006.01)
*G06F 9/30* (2006.01)

(52) U.S. Cl.
CPC *G06F 13/00* (2013.01); *G06F 9/44* (2013.01); *G06F 9/30* (2013.01)
USPC .......................................................... 713/1

(58) Field of Classification Search
CPC ....................................................... G06F 9/24
USPC ...................................................... 713/2, 1
See application file for complete search history.

(56) References Cited

U.S. PATENT DOCUMENTS

| | | | |
|---|---|---|---|
| 6,625,727 B1 * | 9/2003 | Moyer et al. | 713/1 |
| 6,892,323 B2 * | 5/2005 | Lin | 714/36 |
| 7,296,143 B2 * | 11/2007 | Gaskins et al. | 713/2 |
| 7,793,036 B2 * | 9/2010 | Goh et al. | 711/103 |
| 7,886,141 B2 * | 2/2011 | Jan et al. | 713/2 |

* cited by examiner

Primary Examiner — Albert Wang
(74) Attorney, Agent, or Firm — Trop, Pruner & Hu, P.C.

(57) ABSTRACT

An apparatus includes a memory, a processor and a controller. The processor is adapted to begin executing instructions based on content stored starting at a predetermined address in the memory upon reset of the processor. The controller is adapted to, in response to the reset of the processor, provide to the processor content for the predetermined address other than the content that is stored starting at the predetermined address.

22 Claims, 4 Drawing Sheets

US 8,914,624 B2

CHANGING THE RESET STATE OF A PROCESSOR

BACKGROUND

The disclosure generally relates to changing the reset state of a processor.

A microcontroller is an electronic device, which may be employed to perform specific functions (such as controlling buses, displays, user interfaces, etc.) in a variety of different devices, such as computer peripheral devices, wireless devices, point of sale terminals, "smart" power meters, etc. A conventional microcontroller may include a processor core, static random access memory (SRAM), flash memory, various counters, bus interfaces and other digital components, and circuitry to process analog signals, such as analog-to-digital converters (ADCs) and comparators.

SUMMARY

In an embodiment of the invention, a technique includes using a processor that begins executing instructions based on content that is stored starting at a predetermined address in a memory upon reset of the processor. The technique includes, in response to the reset of the processor, providing to the processor content for the predetermined address other than content that is stored starting at the predetermined address.

In another embodiment of the invention, an apparatus includes a memory and a controller. The processor is adapted to begin executing instructions based on content stored starting at a predetermined address in the memory upon reset of the processor. The controller is adapted to, in response to the reset of the processor, provide to the processor content for the predetermined address other than the content that is stored starting at the predetermined address.

In yet another embodiment of the invention, an apparatus includes an integrated circuit that includes a processor, a memory and a controller. The processor begins executing instructions based on content stored starting at a predetermined address in the memory upon reset of the processor. The stored content is associated with a reset routine. The controller is adapted, in response to the reset of the processor, to provide to the processor content for the predetermined address other than content stored starting at the predetermined address.

Advantages and other features of the invention will become apparent from the following drawing, description and claims.

DETAILED DESCRIPTION

Figure 1:
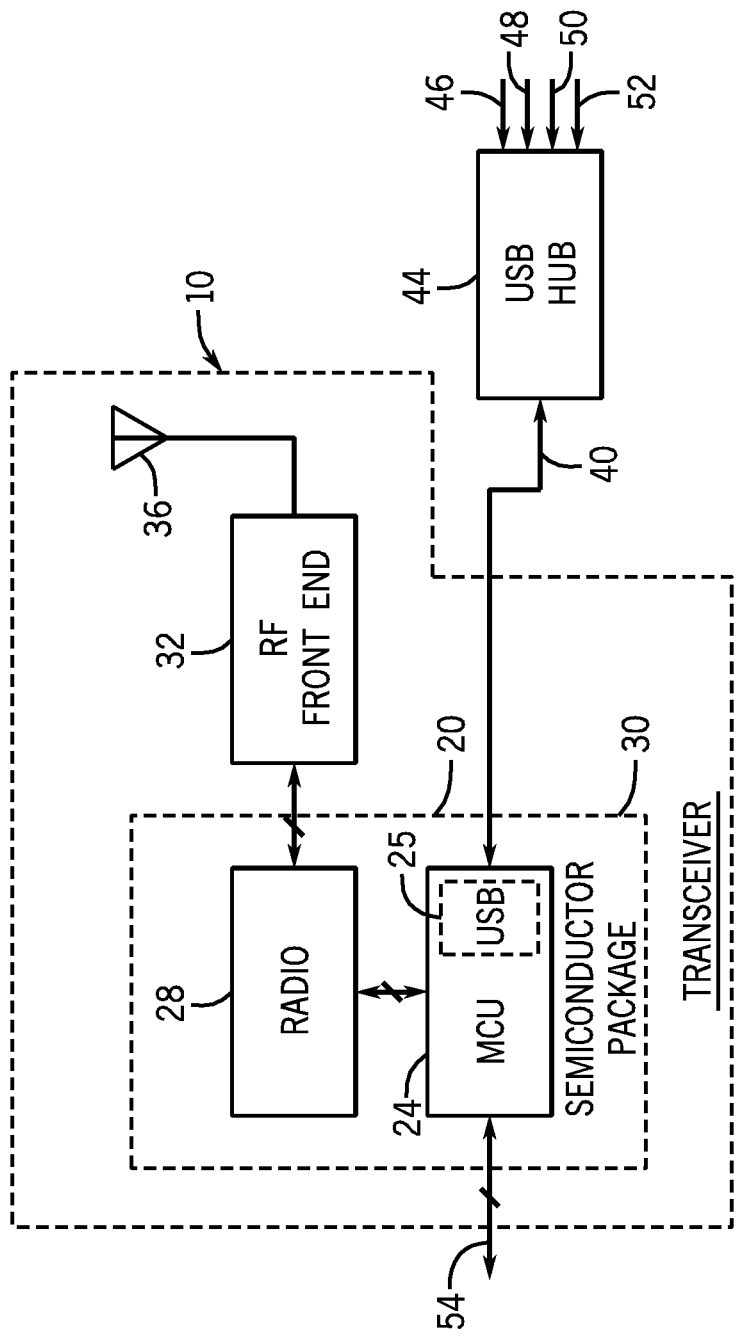
FIG. 1 is a schematic diagram of a transceiver system according to an embodiment of the invention.

Referring to FIG. 1, in accordance with embodiments of the invention disclosed herein, a microcontroller unit (MCU) 24 may be used in a variety of applications, such as applications in which the MCU 24 controls various aspects of a transceiver 10 (as a non-limiting example). In this regard, the MCU 24, for this particular example, may be part of an integrated circuit (IC), or semiconductor package 30, which also includes a radio 28. As a non-limiting example, the MCU 24 and the radio 28 may collectively form a packet radio, which processes incoming and outgoing streams of packet data. To this end, the transceiver 10 may further include a radio frequency (RF) front end 32 and an antenna 36, which receives and transmits RF signals (frequency modulated (FM) signals, for example) that are modulated with the packet data.

As non-limiting examples, the transceiver 10 may be used in a variety of applications that involve communicating packet stream data over relatively low power RF links and as such, may be used in wireless point of sale devices, imaging devices, computer peripherals, cellular telephone devices, etc. As a specific non-limiting example, the transceiver 10 may be employed in a smart power meter which, through a low power RF link, communicates data indicative of power consumed by a particular load (a residential load, for example) to a network that is connected to a utility. In this manner, the transceiver 10 may transmit packet data indicative of power consumed by the load to mobile meter readers as well as to an RF-to-cellular bridge, for example. Besides transmitting data, the transceiver 10 may also receive data from the utility or meter reader for such purposes (as non-limiting examples) as inquiring as to the status of various power consuming devices or equipment; controlling functions of the smart power meter; communicating a message to a person associated with the monitored load, etc.

As depicted in FIG. 1, in addition to communicating with the radio 28, the MCU 24 may further communicate with other devices and in this regard may, as examples, communicate over communication lines 54 with a current monitoring and/or voltage monitoring device of the smart power meter as well as communicate with devices over a Universal Serial Bus (USB) 40. For example, various USB links 46, 48, 50 and 52 may communicate via a hub 44 and USB 40 with the transceiver 10 for such purposes as communicating with a residential computer regarding power usage of various appliances, communicating with these appliances to determine their power usages, communicating with the appliances to regulate their power usages, etc. For purposes of communicating with the USB 40, the MCU 24 has an integrated USB interface 25, in accordance with some embodiments of the invention.

Figure 2:
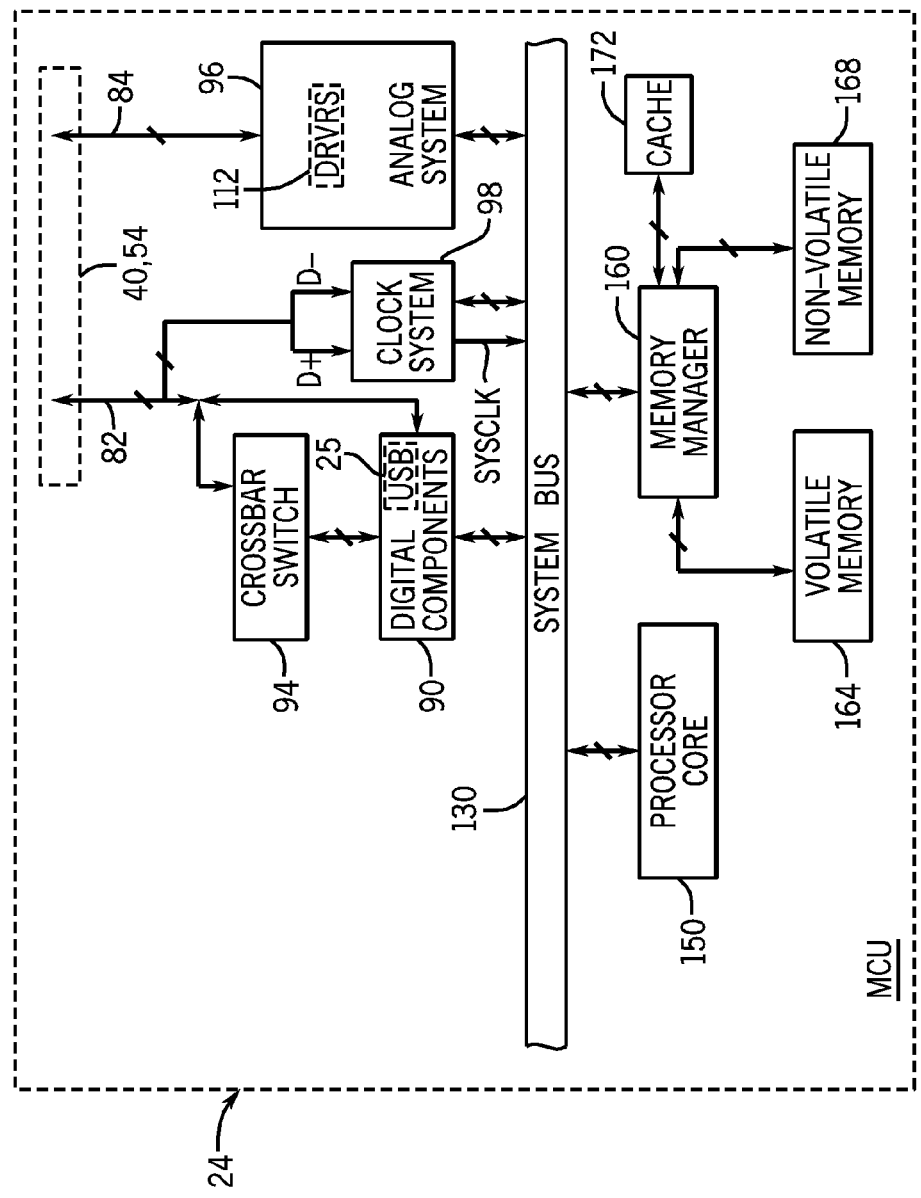
FIG. 2 is a schematic diagram of a microcontroller unit of FIG. 1 according to an embodiment of the invention.

In accordance with embodiments of the invention, the MCU 24 includes various components, such as the components that are depicted in FIG. 2, which may be fabricated on the same die. Referring to FIG. 2, among these components, the MCU 24 includes a processor core 150. As a non-limiting example, the processor core 150 may be a 32-bit core, such as the Advanced RISC Machine (ARM) processor core, which executes a Reduced Instruction Set Computer (RISC) instruction set. In general, the processor core 150 communicates with various other system components of the MCU 24, such as a memory manager 160, over a system bus 130. In general, the memory manager 160 controls access to various memory components of the MCU 24, such as a cache 172, a non-volatile memory 168 (a Flash memory, for example) and a volatile memory 164 (a static random access memory (SRAM), for example).

The MCU 24 also includes various digital peripheral components 90, such as (as non-limiting examples) the USB interface 25, a programmable counter/timer array (PCA), a universal asynchronous receiver/transmitter (UART), a system management bus (SMB) interface, a serial peripheral interface (SPI), etc. The MCU unit 24 may include a crossbar switch 94, which permits the programmable assigning of the digital peripheral components 90 to digital output terminals 82 of the MCU 24. In this regard, the MCU 24 may be, through the crossbar switch 94, configured to selectively assign certain output terminals 82 to the digital peripheral components 90.

In accordance with embodiments of the invention, the MCU 24 also includes an analog system 96, which includes various interfaces to analog terminals 84 of the MCU 24. For example, the analog system 96 may include various components that receive analog signals, such as analog-to-digital converters (ADCs), comparators, etc. Moreover, the analog system 96 may include one or more low dropout (LDO) converters and may include various current drivers that are accessible at external terminals of the MCU 24.

Among its other features, the MCU 24 also includes a clock system 98, which supplies a system clock signal (called "SYSCLK" in FIG. 2) to the system bus 130, which is used to clock operations, for example, of the processor core 150. In general, the clock system 98 recovers a clock signal used in the communication of bursty data on data lines (labeled as the "D+" and "D−" in FIG. 2) over the USB 40, and the clock system 98 may use this recovered clock signal as the SYSCLK clock signal.

When reset (such as a software-initiated reset or a reset due to a system boot-up), components, such as the processor core 150 or digital components 90, may enter a reset state that may be predefined by hardware. For example, upon reset, hardware (flip-flops, for example) of the processor core 150 may change certain register values that cause, as non-limiting examples, initialization of the program counter; initialization of peripheral components; the invocation of a supervisory mode; the masking of certain interrupts; the selection of a given instruction set; etc. In some cases, the built-in reset state of the processor core 150 may be unchangeable. Moreover, the processor core 150 may have a hardcoded reset vector, which directs the core 150 to a specific memory location where instructions associated with a predefined executable reset routine are stored. All of these features may present challenges for an application that uses or assumes a different reset state for the processor core 150 or different reset state(s) for components connected to the core 150.

In accordance with embodiments of the invention disclosed herein, the MCU 24 has features to effectively alter the reset state of the processor core 150 or the reset state of components connected to the core 150 without directly changing the hardware of the core 150, the built-in reset vector or the predefined executable reset routine instructions. More specifically, the MCU 24 is constructed to cause the processor core 150 to be controlled upon reset by alternative content that appears to the processor core 150 to be stored starting at or near the hardware-defined reset vector address. As non-limiting examples, the alternative content may be a vector to another reset routine, an executable jump instruction or executable instructions associated with an alternative reset routine. As yet another non-limiting example, the alternative content may be selected from a set of alternate contents. This selection may be controlled by either static means (e.g., fixed in hardware) or dynamic means (e.g., selected by means of configuration controls such as register bits or external signals).

Figure 3:
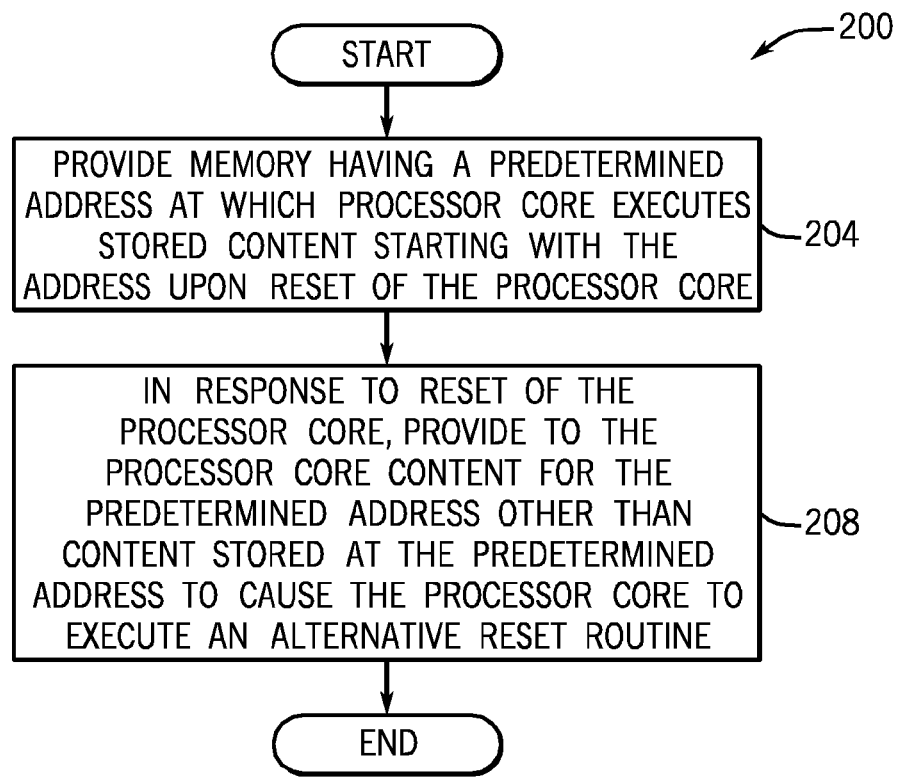
FIG. 3 is a flow diagram depicting a technique to reset a processor according to an embodiment of the invention.

Thus, referring to FIG. 3 in conjunction with FIG. 2, in accordance with embodiments of the invention described herein, a technique 200 may be performed to cause the processor core 150 to execute an alternative reset routine. Pursuant to the technique 200, a memory (such as the boot memory) that has a predetermined address and a processor which begins executing instructions based on stored content starting at the predetermined address upon reset of the processor is provided (block 204). The stored content may be, for example, associated with executable instructions that form a predefined, first reset routine for the processor core 150. In other words, the stored content is associated with the reset routine that the processor core 150 is hardcoded to execute upon reset of the core 150. In response to a reset, however, the technique 200 causes the processor core 150 to execute an alternative set of executable instructions that form an alternative reset routine. More specifically, the technique 200 includes, in response to the processor core 150 being reset, providing (block 208) to the processor core 150 content for the predetermined address other than the content that is actually stored at the predetermined address, which thereby causes the processor core 150 to execute the alternative reset routine. As non-limiting examples, this alternative reset routine may perform accuracy checks of non-volatile memory for security or memory corruption, alter the state of components connected to or associated with the processor, perform communication operations with external devices, etc.

Figure 4:
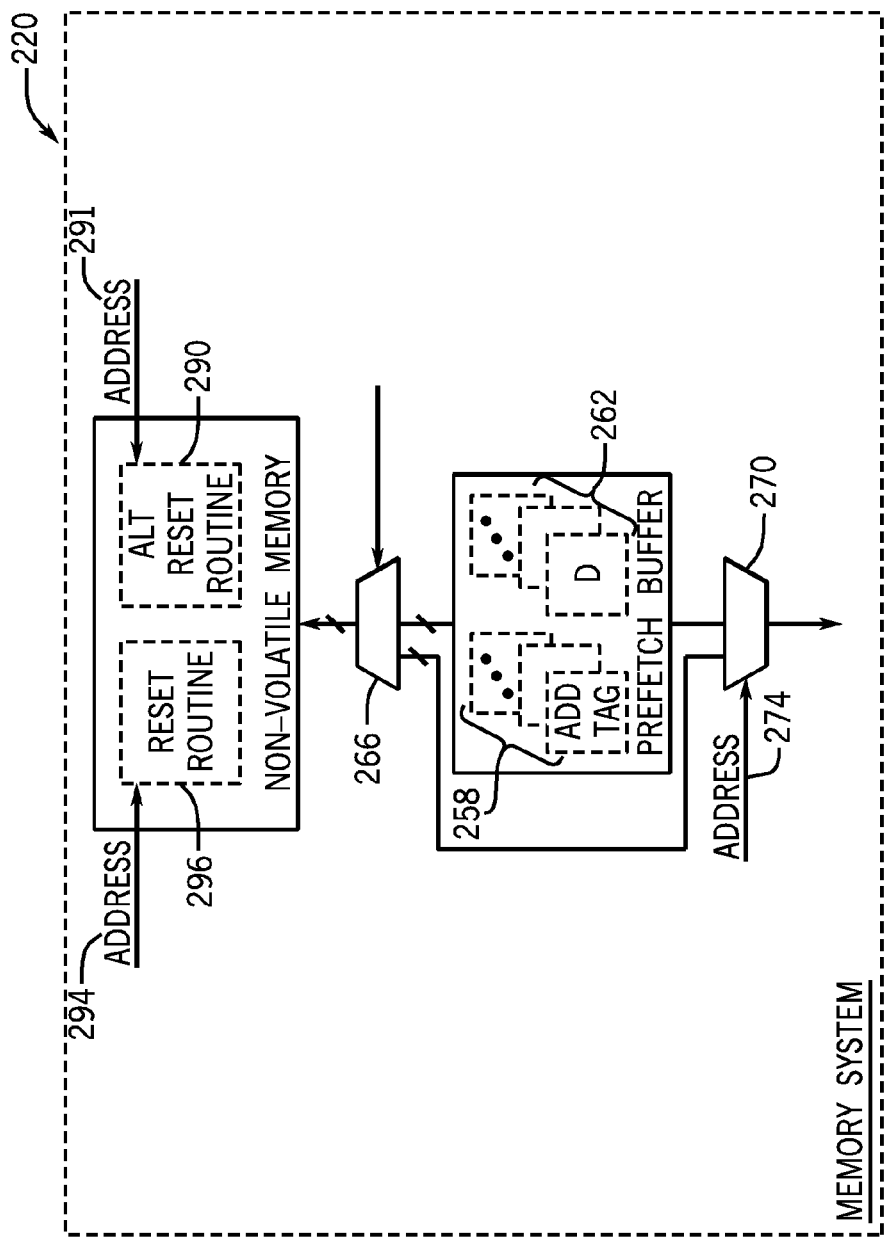
FIG. 4 is a schematic diagram of a memory system of the microcontroller unit of FIG. 2 according to an embodiment of the invention.

Referring to FIG. 4, in accordance with some embodiments of the invention, the substitution of the actual content with the alternative content is performed by a memory system 220 of the MCU 24. As depicted in FIG. 4, in accordance with some embodiments of the invention, the memory system 220 includes the memory manager 160 and the non-volatile memory 168, (the "boot-up" memory for the MCU 24, for example). More specifically, in accordance with some embodiments of the invention, the memory manager 160 includes one or more prefetch buffers 254 (one prefetch buffer 254 being depicted in FIG. 4), which, during normal operation of the MCU 24, contain data 262 indicative of content, which is anticipated by the memory manager 160 to be the target of a future read request based on recent read request activity that targets the non-volatile memory 168.

The memory manager 160 tracks the data 262 that is stored in the prefetch buffer 254 through the use of address tags 258, which are updated by the memory manager 160 to identify the memory locations that are associated with the data 262 stored in the prefetch buffer 254. Therefore, during normal operation, the memory manager 160 responds to a read request that targets the memory address of particular data 262 (as indicated by the associated address tag 258) by retrieving the corresponding content from the prefetch buffer 254, instead of retrieving the data directly from the targeted address in the non-volatile memory 168. As depicted in FIG. 4, the memory manager 160 may contain a multiplexer 270 that selects, based on an address 274 of the read request, whether the data that satisfies a particular read request is contained in the prefetch buffer 254 or is present only in the non-volatile memory 168. As also shown in FIG. 4, the memory manager 160 also includes a multiplexer 266 for purposes of communicating data between the non-volatile memory 168, the prefetch buffer 254 and the multiplexer 270.

When the processor core 150 is reset, the memory manager 160 stores data 262 in the prefetch buffer 254 indicative of content (called the "alternative content" herein), which is associated with an alternative reset routine 290. However, the memory manager 160 tags this alternative content with an address 294 that is associated with a predefined reset routine 296 of the processor core 150 (i.e., the memory manager associates an address tag 258 for the built-in reset routine 296 with the alternative content), thereby altering the reset state of the processor core 150 in a manner that is transparent to an application that relies on or assumes the reset state that is established by the alternative content. It is noted that depending on the particular embodiment of the invention, the alternative content may be a vector to the alternative reset routine 290, actual instructions of the alternative reset routine 290, a jump instruction directed to the memory location of the alternative reset routine 290, etc.

Depending on the particular embodiment of the invention, the memory manager 160 may load the alternative content into the prefetch buffer 254 prior to or upon reset of the processor core 150. For example, in accordance with some embodiments of the invention, the memory manager 160, upon reset of the processor core 150, retrieves the alternative content from protected memory (the non-volatile memory 168, for example), stores the alternative content in the prefetch buffer 254 and tags this alternative content with the corresponding address tag associated with the address 294 of the predefined reset routine 296. As another example, prefetch buffer 254 may contain non-volatile memory that always stores the alternative content. As yet another example, the hardware reset state of the prefetch buffer 254 may be predefined as the alternative content and the hardware reset state of the corresponding address tag may be associated with the address 294 of the predefined reset routine. Additionally, multiple alternative reset routines may exist of which one or more can be selected for association with the alternative contents of the prefetch buffer 254. The selection may be determined through one or multiple mechanisms (a register or a region of the non-volatile memory 168 indicating the selection of one or more of a set of potential reset routines that are stored in the non-volatile memory 168, as non-limiting examples). Non-limiting examples of selecting the alternative reset routine include checking a value of an external pin, checking a state of an internal non-volatile element, and checking a state of a component or memory not affected by reset. Additionally, similar mechanisms may be used to indicate that no alternative content is to be loaded into the prefetch buffer 254, causing the processor core 150 to respond to the actual content stored in the memory rather than any alternative content. Other variations are contemplated and are within the scope of the appended claims.

Figure 5:
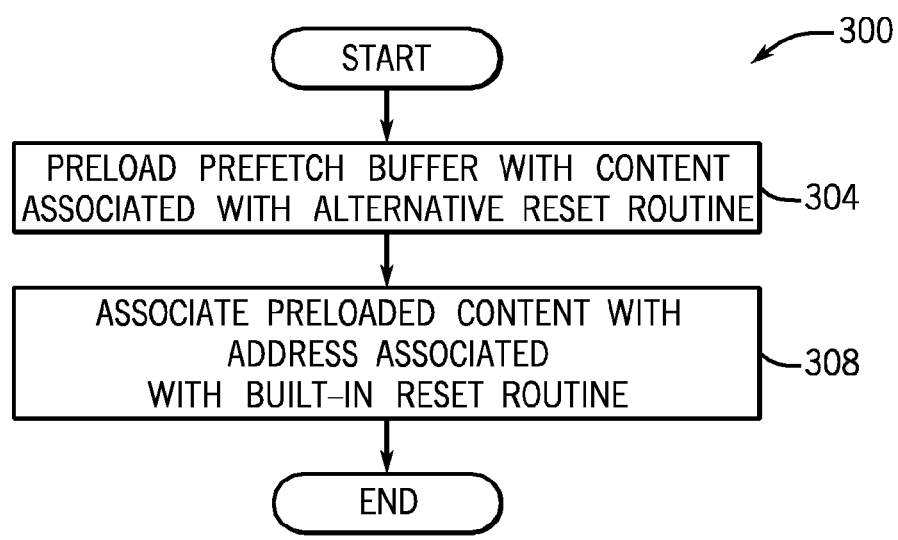
FIG. 5 is a flow diagram depicting a technique performed by the memory manager of FIG. 4 to change a reset state of the processor according to an embodiment of the invention.

Referring to FIG. 5 in conjunction with FIG. 4, to summarize, the memory manager 160 may perform a technique 300 that is depicted in FIG. 5. Pursuant to the technique 300, the memory manager 160 preloads (block 304) the prefetch buffer 254 with content associated with the alternative reset routine 290 and associates the address 294 of the original reset routine 296 with the alternative content using a corresponding address tag 258, pursuant to block 308.

Other variations are contemplated and are within the scope of the appended claims. For example, in accordance with other embodiments of the invention, the processor core 150 may, after execution of the alternative reset routine 290, transfer control back to the original reset routine 296. As another variation, in accordance with other embodiments of the invention, the memory manager 160 may preload the cache 172, instead of the prefetch buffer 254, with alternative content. Thus, in these embodiments of the invention, the cache 172, upon reset of the processor core 150, supplies the alternative content, which appears to be data associated with a cache hit to the address 294 of the built-in reset routine 296. In some embodiments of the invention, the memory manager may control a memory that exists in a separate integrated circuit or semiconductor package other than the one containing the processor core 150, such as, but not limited to, external an NOR FLASH memory, a NAND FLASH memory, a read only memory (ROM), an SRAM, or a dynamic random access memory (DRAM).

While the present invention has been described with respect to a limited number of embodiments, those skilled in the art, having the benefit of this disclosure, will appreciate numerous modifications and variations therefrom. It is intended that the appended claims cover all such modifications and variations as fall within the true spirit and scope of this present invention.

What is claimed is:

1. A method comprising:
using a processor which begins executing instructions based on content stored starting at a predetermined address in a memory upon reset of the processor; and
in response to the reset of the processor, providing to the processor content for the predetermined address other than content stored starting at the predetermined address to place the processor in a reset state.

2. The method of claim 1, further comprising altering a state of the processor or a state of a peripheral coupled to the processor based at least in part on said content for the predetermined address other than content stored at the predetermined address.

3. The method of claim 1, wherein the providing to the processor content for the predetermined address comprises providing a vector pointing to instructions associated with a reset routine.

4. The method of claim 1, wherein the providing to the processor content for the predetermined address comprises providing an instruction associated with a reset routine.

5. The method of claim 1, further comprising:
selecting the content for said predetermined address other than content stored at the predetermined address from a plurality of content.

6. The method of claim 1, wherein the providing to the processor content for the predetermined address comprises using a memory manager for the processor to substitute said content for the predetermined address other than content stored at the predetermined address based on the stored content.

7. The method of claim 6, wherein the using a memory manager comprises loading a cache with said content for the predetermined address other than content stored at the predetermined address.

8. The method of claim 6, wherein the using a memory manager comprises loading a prefetch buffer with said content for the predetermined address other than content stored at the predetermined address.

9. The method of claim 1, wherein the content stored at the predetermined address is associated with a first reset routine, the method further comprising:
executing at least one instruction associated with an alternative reset routine; and
after execution of said at least one instruction, returning control to at least one instruction associated with the first reset routine.

10. The method of claim 1, further comprising:
in response to the reset of the processor, determining whether the content stored at the predetermined address or said content for the predetermined address other than content stored at the predetermined address should be provided to the processor; and
performing the act of providing to the processor content for the predetermined address based at least in part on the determination.

11. The method of claim 1, wherein providing to the processor content for the predetermined address other than the content stored starting at the predetermined address comprises providing to the processor content to perform at least one of initialization of a program counter; select a given instruction set; and invoke a supervisory mode.

12. An apparatus comprising:
a memory;
a processor adapted to begin executing instructions based on content stored starting at a predetermined address in the memory upon reset of the processor; and
a controller adapted, in response to the reset of the processor, to provide to the processor content for the predetermined address other than content stored starting at the predetermined address to place the processor in a reset state.

13. The apparatus of claim 12, wherein the content for the predetermined address other than content stored at the predetermined address comprises a vector pointing to instructions associated with a reset routine.

14. The apparatus of claim 12, wherein the content for the predetermined address other than content stored at the predetermined address comprises an instruction associated with a reset routine.

15. The apparatus of claim 12, wherein the controller comprises a memory manager.

16. The apparatus of claim 12, wherein the controller is adapted to load a cache with said content for the predetermined address other than content stored at the predetermined address.

17. The apparatus of claim 12, wherein the controller is adapted to load a prefetch buffer with said content for the predetermined address other than content stored at the predetermined address.

18. The apparatus of claim 12, wherein the content stored at the predetermined address is associated with a first reset routine, and the processor is adapted to execute at least one instruction associated with an alternative reset routine and after execution of said at least one instruction, return control to at least one instruction associated with the first reset routine.

19. The apparatus of claim 12, wherein the processor and memory are part of a microcontroller.

20. The apparatus of claim 12, wherein the reset state is associated with at least one of initialization of a program counter, invocation of a supervisory mode and selection of a given instruction set for the processor.

21. An apparatus, comprising:
an integrated circuit comprising a processor, a memory and a controller,
wherein the processor is adapted to begin executing instructions based on content stored starting at a predetermined address in the memory upon reset of the processor, the stored content being associated with a reset routine; and
the controller is adapted, in response to the reset of the processor, to provide to the processor content for the predetermined address other than content stored at the predetermined address to place the processor in a reset state.

22. The apparatus of claim 21, wherein the controller comprises a memory manager adapted to store said content for the predetermined address other than content stored at the predetermined address in a prefetch buffer or a cache.

* * * * *